3,184,309
NON-LIGHT SENSITIVE DYE TRANSFER RECEIVING BLANKS AND METHOD OF USING THEM
Louis M. Minsk and Hyman L. Cohen, Rochester, N.Y., assignors to Eastman Kodak Company, Rochester, N.Y., a corporation of New Jersey
No Drawing. Filed Jan. 29, 1962, Ser. No. 169,591
The portion of the term of the patent subsequent to Aug. 7, 1979, has been disclaimed and dedicated to the Public
10 Claims. (Cl. 96—29)

This invention relates to photography, and more particularly, to non-light sensitive photographic dye transfer receiving blanks containing a particular type of basic mordant.

This application is a continuation-in-part of our application Serial No. 663,810, filed June 5, 1957, now U.S. Patent 3,048,487, issued August 7, 1962.

It is known that photographic elements intended for various purposes, such as imbibition printing, color printing, etc., can contain various mordanting materials which are intended to prevent migration of coloring materials or dyes which have been transferred from a printing member onto the photographic element. Many of these mordanting materials are organic in nature and contain long linear chains having basic or acidic groups attached thereto, the character of these groups being varied depending upon the chemical nature of the coloring materials or dyes which are to be received and fixed by the photographic element.

It is, therefore, an object of our invention to provide non-light sensitive photographic elements which can be used as receiving sheets or blanks in such photomechanical processes as imbibition printing. Another object is to provide methods for making these novel non-light sensitive photographic elements. Still another object is to provide improved methods of imbibition printing onto photographic elements. Other objects will become apparent from a consideration of the following description and examples.

The novel mordanting materials of our invention are derived by reacting a maleic anhydride interpolymer, or a closely related derivative thereof, with an unsymmetrically disubstituted diamine. These novel mordants are distinguished from a number of previously employed mordants in that they are substantially free of any residual acid groups. The reaction of these interpolymers with the disubstituted diamines results in an intermediate resinous material which does contain acid groups or ester groups and carboxylic amide groups. These intermediate products are dehydrated by treatment with a dehydrating agent, such as a carboxylic anhydride (e.g., acetic anhydride, propionic anhydride, etc.) by heating, or both, for a sufficient period of time to cause the formation of imide groups from the carboxylic amide groups. The means of accomplishing this imidization have been previously described in the prior art and are illustrated in detail in the examples given below.

It is known that maleic anhydride does not form homopolymers under the usual conditions of polymerization, although it does form interpolymers with a wide variety of monoethylenically-unsaturated compounds of the vinyl and vinylidene type. Maleic anhydride generally enters these polymerizations in a molar ratio of 1:1 so that about 50% of the units of the final polymer are derived from maleic anhydride.

Particularly useful interpolymers of maleic anhydride, or its substituted derivatives, include those polymers represented by the following general formula:

(I) 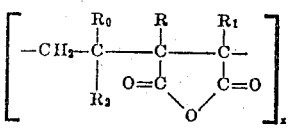

wherein R, $R_0$ and $R_1$ each represents a hydrogen atom or a lower alkyl group, such as methyl, ethyl, etc., $R_2$ represents a hydrogen atom, an alkyl group (e.g., methyl, ethyl, etc.), a monocyclic aryl group (e.g., phenyl, tolyl, etc.) or a carbalkoxyl group (e.g., carbomethoxyl, carbethoxyl, etc.) and $x$ represents a large whole number, such as a whole number greater than about 10. Maleic anhydride interpolymers included by Formula I above have been previously described in numerous prior art references. Such interpolymers are generally derived from monomers, such as ethylene, styrene, isobutylene, acrylic esters, etc. Instead of using maleic anhydride itself in the preparation of these interpolymers, it is possible to use maleic or fumaric acid esters to equal advantage, although the reaction times are generally lengthened in those cases where the ester derivatives are used in place of the anhydride. In like manner, the interpolymers can be obtained from maleic acid or fumaric acid.

According to our invention, interpolymers of the type represented by Formula I above (including the compounds of Formula I or the derivatives illustrated above) are reacted with disubstituted diamines of the type represented by the following general formula:

(II) 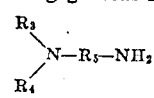

wherein $R_3$ and $R_4$ each represents a lower alkyl group (e.g., methyl, ethyl, n-propyl, n-butyl, etc.) or $R_3$ and $R_4$ together represent the atoms necessary to complete a piperidine or morpholine ring, and $R_5$ represents an alkylene group (e.g., ethylene, propylene, butylene, pentylene, etc., especially an alkylene group containing 2 to 3 carbon atoms).

The reaction of the interpolymers of Formula I with the diamines of Formula II need not be on an equimolar basis, although generally it is advisable to use sufficient diamine to insure reaction of substantially all (i.e., 100%), but at least about 75% to 80%, of the anhydride units in the interpolymer. Where the interpolymer used contains acid groups or ester groups in place of the anhydride units illustrated in Formula I, it is generally preferable to use sufficient amine to react with all of these free acid groups or ester groups. As indicated above, the first step in the reaction of the compounds of Formula I with those of Formula II leads to the formation of derived polymers containing carboxylic amide groups as a result of the reaction of the primary amino group of the compounds of Formula II with the anhydride groups of the polymers represented for Formula I. Further heating either alone or in the presence of a dehydrating agent, such as acetic anhydride, propionic anhydride, etc., leads to the formation of the mordants of our invention which can be represented by the following general formula:

(III)
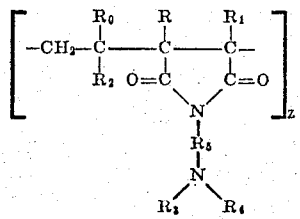

wherein R, $R_0$, $R_1$, $R_2$, $R_3$, $R_4$ and $R_5$ each have the values given above and $z$ represents a large whole number, such as a whole number greater than about 10. ($z$ may be the same as $x$, depending upon the molar quantity of the diamine used, which is used in an amount as indicated above to react with from about 75% to 80% of the anhydride units, as a minimum).

Under the above preparative conditions the product will contain combined acid. This acid may be removed by treatment with a base. Alternatively, the material may be prepared by the dimethyl formamide procedure of Example 15 in which the product is obtained directly as the free base. The free base by either of these procedures is represented by Formula III. All, or a portion of all, of the residual anhydride units are hydrolyzed to carboxylic acid units under the above conditions.

The preparation of the novel mordants of our invention can be carried out in the presence of an inert diluent, such as dioxane, benzene, acetone, etc. The first step of the reaction resulting in the formation of carboxylic amide units in the interpolymer is generally carried out at about the temperature of the steam bath. After the addition of the dehydrating agent, the heating is continued for a period of time sufficient to cause reaction of most of the anhydride, acid or ester groups present in the interpolymer. The preparation of imides has been previously illustrated in McDowell et al. U.S. Patent 2,313,565 issued March 9, 1943. The imides of Patent 2,313,565 generally contain ether groups attached to the linear polymer chain, and we have found that such groups generally cause color formation in the resulting imide polymers. In our process, such ether groups and undesirable free acid groups are avoided.

While the mordants of our invention are illustrated in Formula III above in the form of their free bases, they are customarily employed in our invention in the form of their addition salts with any of the common water-soluble monobasic acids, such as hydrochloric, hydrobromic, lactic, glycolic, alkane carboxylic (e.g., acetic, propionic, etc.), alkane sulfonic (e.g., methanesulfonic, ethanesulfonic, n-butanesulfonic, etc.), etc. These acid addition salts can advantageously be represented by the following general formula:

(IIIa)
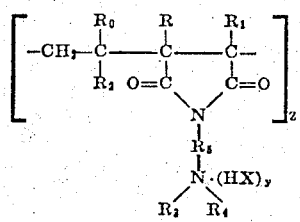

wherein R, $R_0$, $R_1$, $R_2$, $R_3$, $R_4$, $R_5$ and $z$ each have the values given above, X represents an acid radical (inorganic or organic), such as lactyloxy, glycolyloxy, acetoxy, propionoxy, alkanesulfonoxy (e.g., methanesulfonoxy, ethanesulfonoxy, n-butanesulfonoxy, etc., especially such radicals containing from 1 to 4 carbon atoms), chloride, etc., and $y$ represents at least ½$z$ but not more than $z$. Of course, when a carboxylic anhydride is used as the dehydrating agent as shown above, some of the free acid formed forms an acid-addition salt with the polymeric amide. In those cases where the free base or imide is obtained as such, sufficient acid (in aqueous form) can be added until the aqueous solution is rendered acid. The amount of acid needed for this purpose will vary, depending on the particular acid and the intended use of the mordant. In general, sufficient acid is present or used to give a pH below about 6.0.

While maleic anhydride generally enters polymerizations in a 1:1 ratio with a comonomer, sometimes it interpolymerizes in smaller ratios, such as 1:2 (i.e., 33% maleic anhydride units). Maleic anhydride derivatives, such as maleic or itaconic esters, frequently interpolymerize at various ratios. (D'Alelio U.S. Patent 2,298,039, issued October 6, 1942.) The useful interpolymers of Formula I above can contain between about 33 and 50 mol. percent maleic anhydride (or derivative) units. Especially useful interpolymers are those containing a molar ratio of 1:1 of maleic anhydride units.

Our invention can be illustrated by the following examples:

EXAMPLE 1

*Preparation of the imide of the styrene-maleic anhydride interpolymer*

A solution of 40.4 g. (0.2 mole) of styrene-maleic anhydride interpolymer ($\eta=0.21$) in 250 ml. of dioxane was added dropwise with stirring to a solution of 20.4 g. (0.2 mole) of γ-dimethylaminopropylamine in 250 ml. of dioxane while this was being heated on a steam bath. A white granular precipitate separated during the addition (time one-half hour). Following addition, heating and stirring were continued for an additional hour. Fifty-one grams (0.5 mole) of acetic anhydride was then added in one batch, complete solution taking place within ten minutes. The solution was heated for an additional hour, then allowed to cool.

On pouring into three liters of ether, a cream-colored, fibrous precipitate formed. This was washed three times with ether, filtered, and dried under vacuum, leaving 42 g. of cream-colored solid which was soluble in dilute acetic acid and insoluble in alkali.

*Analysis.*—C, 72.4, 72.0; H, 7.6, 7.7; N, 8.2, 8.4; Acetyl, 3.8, 4.1.

EXAMPLE 2

*Imide of the methyl methacrylate-maleic anhydride interpolymer*

(A) PREPARATION OF THE METHYL METHACRYLATE-MALEIC ANHYDRIDE INTERPOLYMER

A mixture of 50 g. (0.5 mole) freshly distilled methyl methacrylate and 49 g. (0.5 mole) of maleic anhydride, 100 ml. of purified benzene and 1 g. of benzoyl peroxide was heated on a steam bath. Within one hour, the material had polymerized to a dark red solid. The mixture was heated for four more hours. The benzene was decanted and the polymer dissolved in 150 ml. of acetone giving a viscous solution. This was poured into 3 liters of ether giving a pink powder which was washed twice with ether, filtered, and dried under vacuum. Yield—67 g.

Calculated for a copolymer containing 70% methyl methacrylate and 30% maleic anhydride:

| | Found |
|---|---|
| C—57.0 | 57.1 |
| H—6.5 | 6.6 |
| Methoxyl—21.7 | 21.9 |

(B) PREPARATION OF γ-DIMETHYLAMINOPROPYLIMIDE OF THE METHYL METHACRYLATE-MALEIC ANHYDRIDE INTERPOLYMER

To a solution of 9.2 g. (0.1 mole) of γ-dimethylaminopropylamine in 100 ml. of dioxane being heated on a steam bath with stirring, was added slowly a solution of 19.8 g. (0.1 mole) of maleic anhydride-methyl methacrylate interpolymer in 100 ml. of dioxane. A white precipitate formed immediately. After addition of the amine, stirring and heating were continued for two more hours. With continued heating and stirring, 30.6 g. (0.3 mole) of acetic anhydride was added. Solution took place in 15 minutes. Heating and stirring were continued for an additional hour. The cooled solution was poured into two liters of ether, precipitating a light gray granular powder. This was washed twice with ether, filtered, and dried under vacuum. Yield—21 g.

Calculated for a copolymer containing
70% methyl methacrylate and 30%
γ-dimethylaminopropyl-maleimide:

|  | Found |
|---|---|
| C—58.3 | 58.2 |
| H—8.8 | 8.9 |
| Acetyl | 0.3 |

EXAMPLE 3

A solution of 20.3 g. (0.15 monomeric mole) of styrene-maleic anhydride interpolymer in 300 ml. of acetone was added over a period of one hour to a stirred refluxing solution of 20 g. (0.15 mole) of γ-diethylaminopropylamine in 300 ml. of acetone. After stirring or refluxing for an additional hour, the white precipitate was almost colloidal in nature.

After adding 30 g. (0.3 mole) of acetic anhydride to the suspension, the mixture was stirred under reflux for an additional hour by which time the precipitate had redissolved. The mixture was cooled and poured into 3 liters of ether. Washing 3 times with ether caused the precipitate to harden. It was filtered and dried under vacuum giving 45 g. of polymer.

Calculated for a copolymer containing
50% styrene and 50% γ-diethylaminopropyl-
maleimide plus 1% acetic acid:

|  | Found |
|---|---|
| C—71.8 | 71.0–71.4 |
| H—8.55 | 8.3– 8.2 |
| N—8.8 | 8.0– 8.3 |
| Acetyl | 1.0– 1.0 |

EXAMPLE 4

The imide of this example was obtained in exactly the manner described in Example 3 above, except that the diamine was replaced by 13.2 g. (0.15 mole) of β-dimethylaminoethylamine. It was obtained in a yield of 33 g.

Calculated for a copolymer containing
50% styrene and 50% γ-dimethyl-
aminoethylmaleimide:

|  | Found |
|---|---|
| C—70.7 | 70.1–70.5 |
| H—7.35 | 6.7–7.0 |
| N—10.0 | 9.6–9.8 |
| Acetyl | 0.2 |

EXAMPLE 5

The imide of this example was obtained in exactly the manner described above in Example 3, except that the diamine was replaced by 17.9 g. (0.15 mole) of δ-dimethylaminobutylamine. It was obtained in a yield of 45 g.

Calculated for a copolymer containing
50% styrene and 50% δ-dimethyl-
aminobutylmaleimide plus 4% acetic
acid:

|  | Found |
|---|---|
| C—70.05 | 68.5–68.2 |
| H—7.94 | 8.7–8.8 |
| N—8.85 | 7.3–7.1 |
| Acetyl | 4.1–4.3 |

EXAMPLE 6

This imide was obtained in exactly the manner described in Example 3 above, except that the diamine was replaced by 19.2 g. (0.15 mole) of ω-dimethylaminopentylamine. It was obtained in a yield of 50 g.

Calculated for a copolymer containing
50% styrene and 50% ω-dimethyl-
aminopentylmaleimide plus 2.6% acetic
acid:

|  | Found |
|---|---|
| C—71.5 | 67.7–67.4 |
| H—8.3 | 8.3–8.0 |
| N—8.6 | 7.1–7.1 |
| Acetyl | 2.6 |

EXAMPLE 7

This imide was obtained in exactly the manner described in Example 3 above, except that the diamine was replaced by 22 g. (0.15 mole) of γ-piperidinopropylamine. It was obtained in a yield of 45 g.

Calculated for a copolymer containing
50% styrene and 50% γ-piperidinopro-
pylmaleimide plus 1% acetic acid:

|  | Found |
|---|---|
| C—73.7 | 73.3–72.9 |
| H—8.0 | 7.2–7.5 |
| N—8.4 | 7.8–8.2 |
| Acetyl | 1.0 |

EXAMPLE 8

This imide was obtained according to the process of Example 3 above except that the diamine was replaced by 30 g. (0.17 mole) of β-di-n-butylaminoethylamine. After preparation of the polymer, it was precipitated in 5 percent ammonia.

Calculated for a copolymer containing
50% styrene and 50% β-di-n-butyl-
aminoethylmaleimide:

|  | Found |
|---|---|
| C—74.3 | 73.3–73.4 |
| H—8.9 | 9.1–8.9 |
| N—7.88 | 7.8–7.4 |

EXAMPLE 9

*γ-Dimethylaminopropylimide of methyl methacrylate-maleic anhydride interpolymer*

The methyl methacrylate-maleic anhydride interpolymer used in this example was prepared exactly as described in Example 2 above. To a solution of 19 g. (0.19 mole) of γ-dimethylaminopropylamine in 300 ml. of acetone was added a solution of 30 g. (0.15 mole) of the above methyl methacrylate-maleic anhydride interpolymer in 300 ml. of acetone. The mixture was then treated and the product isolated as described above in Example 3. Yield 34 g.

Calculated for a copolymer containing
70% methyl methacrylate and 30%
γ-dimethylaminopropylmaleimide plus
1.5% acetic acid:

|  | Found |
|---|---|
| C—60.0 | 58.7–58.8 |
| H—7.85 | 8.0–7.9 |
| N—7.35 | 5.9–6.0 |
| Acetyl | 1.5–1.8 |

EXAMPLE 10

This imide was obtained according to the process of Example 3 above except that the maleic anhydride interpolymer was replaced by 30 g. (0.14 mole) of p-vinyltoluene-maleic anhydride interpolymer. It was separated exactly as described in Example 3. Yield: 36 g.

Calculated for a copolymer containing
50% p-vinyltoluene and 50% γ-di-
methylaminopropylmaleimide plus 2.6%
acetic acid:

|  | Found |
|---|---|
| C—70.7 | 71.0 |
| H—7.95 | 8.0 |
| N—8.95 | 8.3 |
| Acetyl | 2.6 |

EXAMPLE 11

*γ-Dimethylaminopropylimide of styrene-itaconic anhydride interpolymer*

This imide was obtained according to the process of Example 3 above except that the maleic anhydride interpolymer was replaced by 14 g. (0.065 mole) of styrene-itaconic anhydride interpolymer and the diamine was replaced by 10 g. (0.1 mole) of γ-dimethylaminopropylamine. Yield: 20 g.

Calculated for a copolymer containing
50% styrene and 50% γ-dimethyl-
aminopropyl itaconicimide plus 2.1%
acetic acid:

|  | Found |
|---|---|
| C—70.5 | 70.5–70.5 |
| H—7.95 | 7.8–8.0 |
| Acetyl | 2.1 |

EXAMPLE 12

A mixture of 104 g. (1.0 mole) of styrene, 172 g. (1.0 mole) of diethylfumarate and 1 g. of benzoyl peroxide was heated for 24 hours in a 60° C. bath giving a very viscous product. This was dissolved in seven volumes of acetone and precipitated in hexane giving a soft product which slowly hardened on washing with more hexane. The product was dried under vacuum giving a yield of 143 g.

*Analysis.*—C, 71.4, 71.5; H, 7.3, 7.4; Inherent viscosity 0.39. This carbon analysis indicated a 55.7 mole percentage of styrene.

A solution of 20 g. of this polymer in 190 ml. of γ-dimethylaminopropylamine was heated for 24 hours in a steel bomb at 180–200° C. and cooled. Following dilution of the reaction mixture with 100 ml. of acetone, the product was precipitated and washed in hexane, then dried under vacuum. It was redissolved in acetone and reprecipitated in hexane in order to remove traces of amine. There remained 19 g. of fibrous product, soluble in dilute acetic acid.

*Analysis.*—C, 71.2, 71.4; H, 7.6, 7.7; N, 6.6, 6.7; Ethoxyl, 8.7, 8.9.

Heating of the above polymer for another period of 24 hours with another charge of the amine, followed by isolation of the polymer according to the method described above, gave a product of lower ethoxyl content. When this procedure was repeated 4 times, the resulting product was devoid of ethoxyl.

*Analysis.*—C, 73.2, 73.4; H, 7.3, 7.8; N, 8.9, 9.0. This nitrogen value indicates that the polymer contains approximately 55.6 mole percent of styrene.

EXAMPLE 13

A solution of 86 g. (0.5 mole) of diethylfumarate, 52 g. (0.5 mole) of distilled 2-vinylpyridine and 0.5 g. of azobisisobutyronitrile in 75 ml. of acetone was heated under reflux overnight. Pouring the solution into hexane precipitated a dark brown powder which was washed several times with hexane, filtered, and dried under vacuum. Yield 33 g.

*Analysis.*—C, 68.8; H, 7.2; N, 7.5; Ethoxyl, 21.5. Inherent viscosity: 0.06.

A solution of 25 g. of this polymer in 190 ml. of γ-dimethylaminopropylamine was heated at 175–200° C. in a steel bomb for 18 hours. After cooling, the polymer was precipitated in hexane and washed several times with hexane giving a friable powder.

Yield: 18 g. It was soluble in dilute acetic acid.

*Analysis.*—C, 68.9; H, 7.3; N, 11.4; Ethoxyl, 10.4.

EXAMPLE 14

*Preparation of γ-dimethylaminopropylimide of isobutylene-diethylfumarate interpolymer*

PREPARATION OF POLYMER

A mixture of 50 g. (0.9 mole) isobutylene, 50 g. (0.3 mole) of diethylfumarate, 2 g. of sodium lauryl sulfate, 0.3 g. potassium persulfate, 1.6 ml. of 30% hydrogen peroxide and 215 ml. of water were tumbled in closed pop bottle at 50° C. overnight. After cooling, the bottle was opened allowing the excess isobutylene to evaporate. Addition of 25 ml. of acetone to the residue caused the polymer to coagulate. It was removed, washed with water, and dried under vacuum. The dried polymer was redissolved in acetone, filtered, and precipitated in hexane. Yield: 19 g.

*Analysis.*—Calc'd for 1/1 mole polymer C, 63.1; H, 8.8. Found: C, 63.8, 63.3; H, 8.8; Visc. 0.42.

A solution of 18 g. of this polymer in 200 ml. of γ-dimethylaminopropylamine was heated to 180–200° C. in a steel bomb for 16 hours. The polymer was then precipitated in hexane and purified by resolution in acetone and precipitation in hexane. It was then dried under vacuum. Yield: 18 g.

*Analysis.*—C, 63.1, 63.6; H, 8.9, 8.9; N, 8.2, 8.0; Ethoxyl, 0.

Instead of dehydrating the carboxylic amide intermediates resulting from the reaction of the polymers represented by Formula I above with the diamines of Formula II above by means of a carboxylic anhydride, it is possible to dehydrate these intermediate polymers merely by heating until water is distilled from the reaction mixture. Since a solvent is generally present in the reaction mixture, this solvent frequently distills from the reaction mixture and may form an azeotrope with the water. Such a method is illustrated in the following example.

EXAMPLE 15

When a solution of 20.2 g. (0.1 mole) of styrene-maleic anhydride interpolymer in 200 ml. of dimethylformamide was added slowly to a solution of 14 g. (0.14 mole) of γ-dimethylaminopropylamine in 200 ml. of dimethylformamide, a white, gummy precipitate formed. When the reaction was carried out on a steam pot, the precipitate slowly dissolved. However, cooling the mixture caused precipitation to occur.

The solution was therefore slowly distilled with stirring until 100 ml. of distillate was collected. The still pot temperature slowly rose from 115 to 150° C. during this procedure. On cooling there was no precipitate. The product precipitated on pouring into water as a friable powder. It was washed with water, filtered and vacuum dried giving 23 g. of a white voluminous powder which was completely soluble in dilute acetic acid.

*Analysis.*—C, 70.5, 70.7; H, 7.7, 8.0; N, 9.4, 9.4.

The product of Example 15 is obtained in the form of a free base, and this can be converted to acid-addition salts in the manner described above. While acetic acid has been illustrated in the example, it is obvious that other acids of the type mentioned above can be used to equal advantage.

The following examples will serve to illustrate the manner of making useful dye imbibition printing blanks according to our invention.

EXAMPLE 16

A dye transfer receiving sheet or blank was prepared as follows: 454 grams of gelatin were soaked in 536 cc. of distilled water until well swollen, and the mixture heated to 40° C. to dissolve the gelatin. Saponin solution was added as a coating aid, and 65 cc. of 50% aqueous glycerin and 1000 grams of a 10% solution of the resinous mordant styrene-γ-dimethylaminopropylmaleimide in dilute acetic acid. The pH of the mixture was adjusted to approximately 4.2 and 27 cc. of a 10% aqueous formaldehyde solution added. The resulting solution was coated onto a cellulose acetate film support at the rate of approximately 1.25 grams of gelatin (dry weight) per square foot and dried.

A gelatin imbibition relief of the kind used in dye-transfer printing processes was prepared on ordinary Wash-Off Relief Film, such as Eastman Matrix Film, by exposing, tanning development, and washout. The relief image was dyed for two minutes in a 0.5% solution of Erio Fast Cyanine Dye (Color Index No. 1053) in 1% aqueous acetic acid and rinsed for ten seconds in running water, the matrix was then squeegeed and rolled into contact with the dye transfer receiving sheet or blank. After one minute of transfer time at 105° F. the relief and blank were separated. A dye image of excellent contrast and good definition was present in the blank.

EXAMPLE 17

A dye transfer receiving sheet or blank was prepared as described above in Example 16, except that a copolymer of styrene and N-β-dimethylaminoethylmaleimide was employed (in acetic acid solution) as the mordant.

A photographic element was prepared as described in Example 4 of Kodak Belgian Patent 578,470, issued November 6, 1959. The photographic element was then exposed and developed for 30 seconds in a conventional color developer comprising an alkaline solution of 4-amino-N-ethyl-N-(β-hydroxyethyl)aniline as the developing agent. The receiving sheet prepared as described above was then rolled into contact with the processed color element and left for 7 minutes, after which time the blank and photographic element were separated. A 3-colored dye image of good contrast and definition had been transferred from the photographic element into the receiving sheet or blank.

EXAMPLE 18

A dye transfer receiving sheet or blank was prepared as described in Example 16, except that a copolymer of methylmethacrylate and N-γ-dimethylaminopropylmaleimide (in acetic acid solution) was employed as the mordant.

A photographic element was prepared as described in Example I of Kodak Belgian Patent 607,420, issued August 15, 1961. This element was then exposed to a photographic image in the usual manner and then moistened with an aqueous activator solution containing 3.5% of high viscosity hydroxyethyl cellulose, 4.5% of sodium hydroxide and 2% of benzotriazole. The processed element was then rolled into contact with the receiving sheet or blank and allowed to remain in surface contact with the blank for a period of 5 minutes. Upon separating the photographic element from the receiving sheet or blank, a three-color dye image of good contrast and definition was apparent in the printing blank.

EXAMPLE 19

This example illustrates the preparation of imbibition printing blanks using the novel mordants of our invention. 454 g. of gelatin were soaked in 536 cc. of distilled water until well swollen, and the mixture heated to 40° C. to dissolve the gelatin. Some saponin solution was then added as a coating aid, and 65 cc. of 50% aqueous glycerin and 1000 g. of a 10% solution of the resinous mordant produced according to Example 3 in dilute acetic acid. The pH of the mixture was adjusted to approximately 4.2 and 27 cc. of 10% aqueous formaldehyde solution added. The resulting solution was coated onto a cellulose acetate film support at the rate of approximately 1.25 g. of gelatin (dry weight) per square foot.

The novel mordants of our invention, in the form of their water-soluble addition salts, can be incorporated in any of the conventional water-permeable hydrophilic organic colloids and the resulting mixture used in the preparation of dye imbibition printing blanks. Photographic grade gelatin is particularly useful as the binding colloid for the mordant. Other hydrophilic colloids which have been used include albumen, polyvinyl alcohol, agar agar, collagen, partially hydrolyzed cellulose esters, sodium alginate, etc.

The quantity of mordant employed in the water-permeable colloid can be varied, depending upon the particular mordant and its chemical characteristics, as well as the dyes to be fixed in the mordanting layer. In general, the quantity of mordant should be at least 10% by weight, based on the weight of hydrophilic colloid. Larger amounts of mordant can be employed in the hydrophilic colloid layers and amounts as high as 50% by weight, based on the weight of the hydrophilic colloid, give quite useful results.

We have also prepared mordants by interpolymerizing an acrylic ester (i.e., acrylic or methacrylic) of a dialkylamino-substituted alcohol with another monoethylenically unsaturated compound (e.g., styrene, isobutylene, etc.) but have found that these mordants which do not contain an imide group are not nearly so useful as the imide polymers described above. A typical acrylic ester polymer was obtained by refluxing overnight a solution of 51 g. of styrene, 77 g. of β-dimethylaminoethylmethacrylate and 0.5 g. of azobisisobutyronitrile in 50 ml. of acetone. The resulting viscous solution was diluted with an equal volume of acetone and precipitated into hexane. After washing and drying, there were obtained 80 g. of polymer containing 73.4% carbon, 8.7% hydrogen and 4.9% nitrogen. Instead of using acrylic esters, it is possible to use acrylic amides, as suggested in Carroll et al. U.S. Patent 2,675,316, issued April 13, 1954.

The new mordants of our invention can also be used for fixing the dyes, and particularly acid dyes, used in the preparation of photographic filter, antihalation or gelatino-silver-halide emulsion layers. Such layers can be coated on conventional photographic supports, such as flexible sheet supports (e.g., cellulose acetate, polyester films, polyvinyl resins, etc.) or paper, glass, etc.

The invention has been described in detail with particular reference to preferred embodiments thereof, but it will be understood that variations and modifications can be effected within the spirit and scope of the invention as described hereinabove and as defined in the appended claims.

What we claim as our invention and desire secured by Letters Patent of the United States is:

1. A dye imbibition printing blank consisting of a flexible sheet support and a layer consisting essentially of a hydrophilic colloid and an interpolymer containing at least 75 mole percent of units represented by the following general formula:

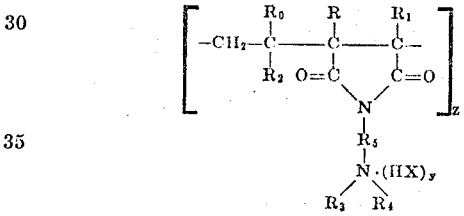

wherein R, $R_0$ and $R_1$ each represents a member selected from the group consisting of a hydrogen atom and a lower alkyl group, $R_2$ represents a member selected from the group consisting of a hydrogen atom, an alkyl group, a monocyclic aryl group and a carbalkoxyl group, $R_3$ and $R_4$ each represents a member selected from the group consisting of a lower alkyl group and together represent the atoms necessary to complete a heterocyclic ring selected from the group consisting of piperidine and morpholine, $R_5$ represents an alkylene group, z represents a positive integer greater than about 10, X represents the acid radical of a water-soluble monobasic acid, and y has a value from ½ to 1 times z.

2. A method of preparing photographic images of high resolution comprising contacting in the presence of water (a) a photographic element containing at least one photographic dye image composed of a diffusible acid dye with (b) a dye imbibition printing blank consisting of a flexible sheet support and a layer consisting essentially of a hydrophilic colloid and an interpolymer containing at least 75 mole percent of units represented by the following general formula:

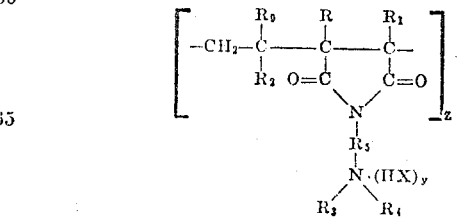

wherein R, $R_0$ and $R_1$ each represents a member selected from the group consisting of a hydrogen atom and a lower alkyl group, $R_2$ represents a member selected from the group consisting of a hydrogen atom, an alkyl group, a monocyclic aryl group and a carbalkoxyl group, $R_3$ and $R_4$ each represents a member selected from the group consisting of a lower alkyl group and together represent the atoms necessary to complete a heterocyclic ring selected from the group consisting of piperidine and morpholine, $R_5$ represents an alkylene group, $z$ represents a positive integer greater than about 10, X represents the acid radical of a water-soluble monobasic acid, and $y$ has a value from ½ to 1 times $z$, and diffusing said acid dye into said dye imbibition printing blank and adsorbing said acid dye upon said interpolymer.

3. A dye imbibition printing blank as defined in claim 1 wherein the hydrophilic colloid is gelatin.

4. A dye imbibition printing blank consisting of a flexible sheet support and a layer consisting essentially of a hydrophilic colloid and an interpolymer containing at least 75 mole percent of units represented by the following general formula:

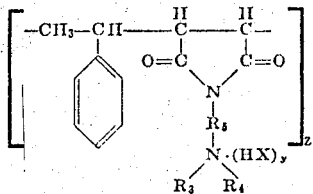

wherein $R_3$ and $R_4$ each represents a lower alkyl group, $R_5$ represents an alkylene group, $z$ represents a positive whole number greater than about 10, X represents a saturated aliphatic carboxylic acyloxy radical, and $y$ has a value of from ½ to 1 times $z$.

5. A dye imbibition printing blank as defined in claim 4 wherein the hydrophilic colloid is gelatin.

6. A dye imbibition printing blank consisting of a flexible sheet support and a layer consisting essentially of a hydrophilic colloid and an interpolymer containing at least 75 mole percent of units represented by the following general formula:

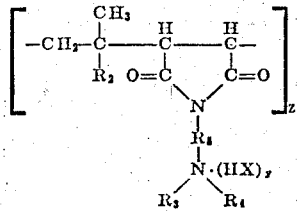

wherein $R_2$ represents a carbalkoxyl group, $R_3$ and $R_4$ each represents a lower alkyl group, $R_5$ represents an alkylene group, $z$ represents a positive whole number greater than about 10, X represents a saturated aliphatic carboxylic acyloxy group, and $y$ has a value of from ½ to 1 times $z$.

7. A dye imbibition printing blank as defined in claim 6 wherein the hydrophilic colloid is gelatin.

8. A dye imbibition printing blank consisting of a flexible sheet support and a layer consisting essentially of a hydrophilic colloid and an interpolymer containing at least 75 mole percent of units represented by the following general formula:

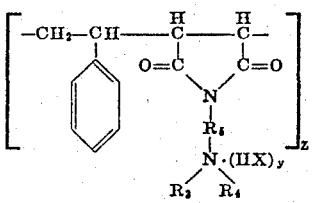

wherein $R_3$ and $R_4$ together represent the atoms necessary to complete a piperidine ring, $R_5$ represents an alkylene group, $z$ represents a positive whole number greater than about 10, X represents a saturated aliphatic carboxylic acyloxy radical, and $y$ has a value of from ½ to 1 times $z$.

9. A dye imbibition printing blank as defined in claim 8 wherein the hydrophilic colloid is gelatin.

10. A process according to claim 2 wherein said hydrophilic colloid is gelatin.

References Cited by the Examiner
UNITED STATES PATENTS

| | | | |
|---|---|---|---|
| 2,671,071 | 3/54 | Laakso. | |
| 2,675,316 | 4/54 | Carroll et al. | |
| 2,686,774 | 8/54 | D'Alelio | 260—78 |
| 2,882,156 | 4/59 | Minsk | 96—84 |
| 2,983,606 | 5/61 | Rogers | 96—29 |
| 3,048,487 | 8/62 | Minsk et al. | 96—84 |
| 3,075,841 | 1/63 | Lehman et al. | 96—77 |

FOREIGN PATENTS 618,712    4/61    Canada.

NORMAN G. TORCHIN, *Primary Examiner.*